March 24, 1959     L. MEIJER     2,878,606
LAMINATED FLUORESCENT SIGN
Filed Dec. 23, 1954     2 Sheets-Sheet 1

Inventor
Leo Meijer
by Parker & Carter
Attorneys

March 24, 1959 L. MEIJER 2,878,606
LAMINATED FLUORESCENT SIGN
Filed Dec. 23, 1954 2 Sheets-Sheet 2
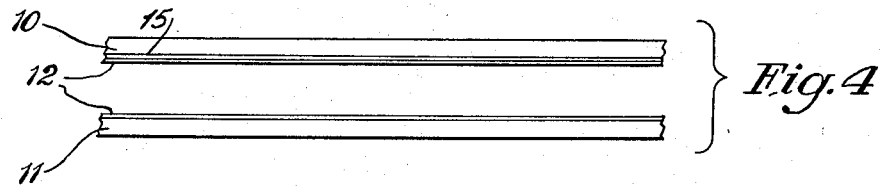
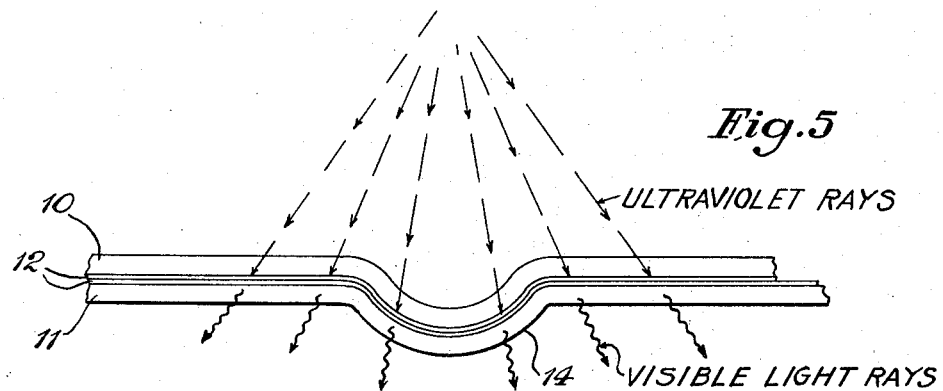
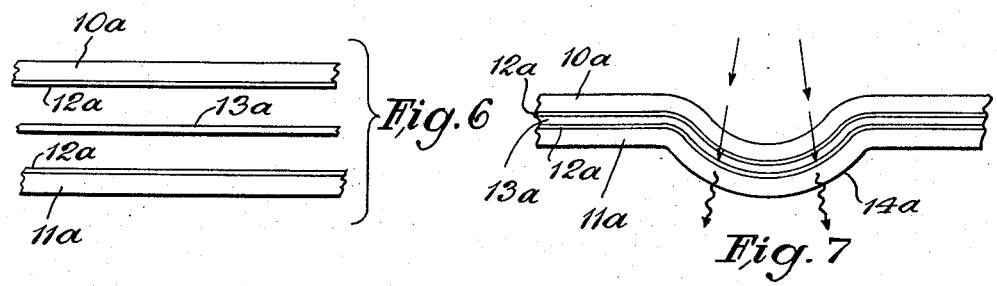
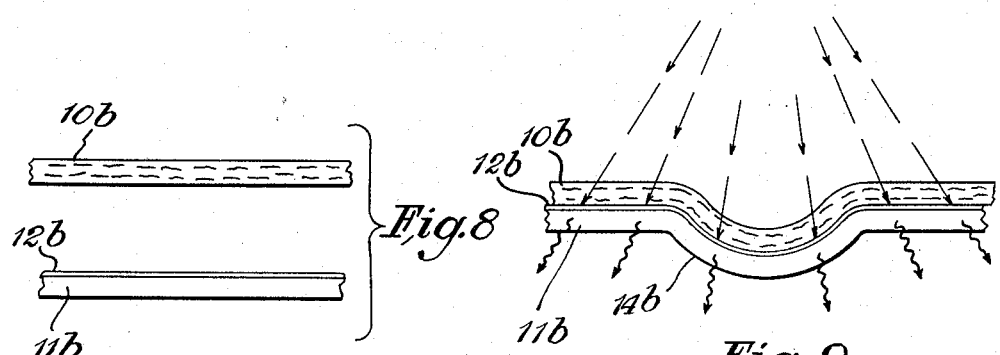
Inventor
Leo Meijer
by Parker & Carter
Attorneys

United States Patent Office 2,878,606
Patented Mar. 24, 1959

2,878,606

LAMINATED FLUORESCENT SIGN

Leo Meijer, Chicago, Ill.

Application December 23, 1954, Serial No. 477,199

11 Claims. (Cl. 40—134)

My invention relates to display systems and devices where a source of ultraviolet light activates and makes luminescent signs and displays.

Such signs made of plastic of the desired shape and configuration, coated or impregnated with luminescent material have been used in the past. When used outdoors—as such signs usually are—they are exposed to the deteriorating effect of climatic conditions, daylight and especially to the ultraviolet rays of the sun. Such exposure has a deteriorating effect on the luminescent material and such signs or displays have heretofore had but a limited life.

I propose to provide a luminous sign wherein the fluorescent pigments in the display are completely sealed from and protected against climatic conditions and protected from the deleterious effect of sunlight. The display and it may take the form of letters, figures or pictures, including a plastic body either coated or impregnated with a fluorescent pigment may be applied in the form of a sandwich of a plurality of sheets. One sheet may be to some extent impervious to ultraviolet rays, the other sheet pervious to them. The display may include a thin sheet pervious to ultraviolet rays sandwiched between the two sheets and carrying the pigment or the display may be applied to one or other of the opposed faces of the pervious or the impervious sheet. In any event, the display will be sandwiched between at least two protective layers which will be sealed against the elements and one layer, the one exposed to the sunlight will be to a greater or less extent impervious to ultraviolet rays while the other layer exposed to a source of ultraviolet light apart from sunlight will be to a maximum extent pervious to ultraviolet rays.

One object of the invention is to provide in a luminous sign means whereby the luminescent pigment is protected from the elements and from the sunlight while at the same time such pigment may when desired, be exposed to artificial rays which result in the desired luminescence of the sign.

Another object of the invention is to provide a luminescent sign wherein the luminescent pigment may be painted, printed or silk screened and at the same time is completely protected against the deleterious effect of climatic conditions and the ultraviolet rays of the sun.

Another object of my invention is to provide a luminescent sign having greatly increased effective life far beyond that hitherto characteristic of luminescent signs.

Another object of my invention is to provide a novel method for the forming of a luminescent or fluorescent display.

Other objects will appear from time to time throughout the specification and claims.

My invention is illustrated more or less diagrammatically in the accompanying drawing, wherein—

Figure 4 is an exploded diagrammatic view of some of the elements of the device;

Figure 5 is a diagrammatic edge view of a display element;

Figure 6 is an exploded diagrammatic edge view illustrating another embodiment of the invention;

Figure 7 is an edge view of a display formed in accordance with the principles illustrated in Figure 6;

Figure 8 is an exploded edge view of a further modified form;

Figure 9 is an edge view of a display formed in accordance with the principles shown in Figure 8.

Like parts are indicated by like characters throughout the specification and drawings.

Figure 1:
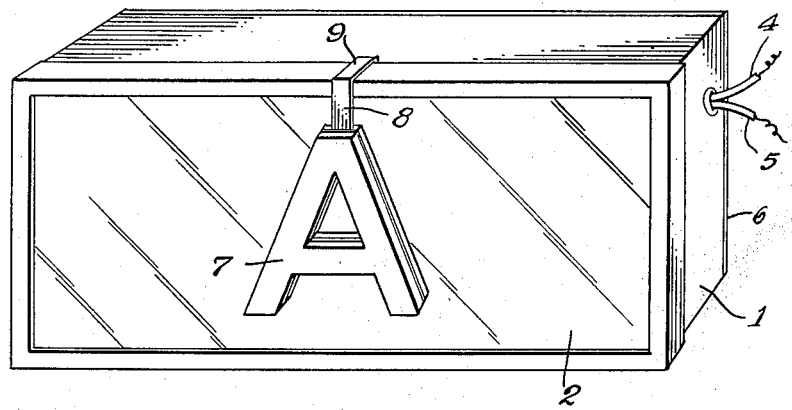
Figure 1 is a perspective view of the device.
Figure 2:
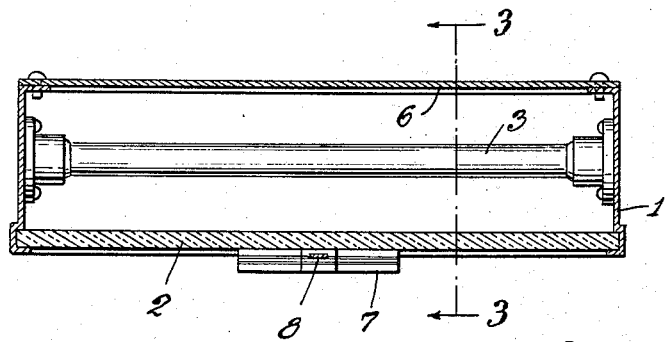
Figure 2 is a plan view in part section of the device shown in Figure 1.
Figure 3:
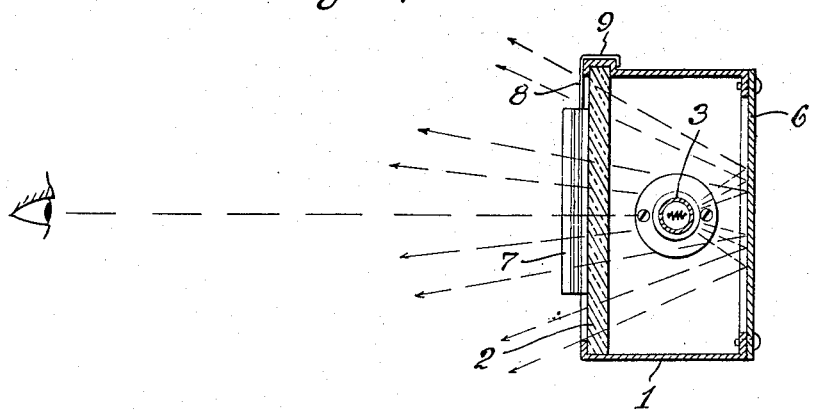
Figure 3 is a section along the line 3—3 of Figure 2.

Referring to Figures 1, 2 and 3, the housing 1 has a transparent panel 2 closing the open front thereof. It may contain an ultraviolet light source 3 positioned and energized through any suitable electrical connections 4 and 5. The rear of the housing may, if desired, be formed of a sheet 6 which is coated with luminescent material adapted when energized by the ultraviolet light rays from the source 3 to transmit visible light through the transparent panel 2.

The disclosure of Figures 1 to 3 inclusive is illustrative only. The luminescent coating on sheet 6 may be omitted, in which case only ultraviolet rays will be projected through the transparent panel 2 to energize the fluorescent pigment in the display, under which conditions, the display will be seen against a dark background in contrast with the lighter background which may be of a different color for the display when panel 6 carries a luminescent coating. On the other hand, the transparent sheet 2 may have substituted for it the type of sheets disclosed in Figures 4 to 9 inclusive as will hereinafter appear.

Figures 4 and 5 illustrate one aspect of my invention. Plastic sheet 10 transmits ultraviolet light rays from 2650 angstrom units up and forms the rear portion of the display. Plastic sheet 11 absorbs ultraviolet light rays up to 3500 angstrom units and forms the front of the display. These two sheets are in opposition to one another. The opposed faces of sheets 10 and 11 may one or both be coated with a binder 12, which will bond the two sheets together and either one of the sheets on the inner face may be provided with a coating or pattern of luminescent material 15 which may take the form of luminescent particles dispersed through a paint or applied by silk screen or by any other suitable means. The two sheets are heated to the temperature necessary to bond them, are brought together and pressed together as illustrated in Figure 5. If desired, the sheets may be formed as indicated at 14 to any suitable shape. When the sheets are allowed to cool, they are ready for use with the display system and may either be cut into letters as indicated in Figure 1 or used in place of the transparent panel 2.

Figures 6 and 7 illustrate a modification of my invention wherein 13a is a sheet impregnated or coated with luminescent material in the desired pattern sandwiched between sheets 10a and 11a and the binder 12a on the opposite faces of sheets 10a and 11a cements under heat and pressure in the usual way, the three elements of the sandwich together, again protecting the luminescent pigment from the elements between the two plastic sheets. 14a illustrates the forming of the sheet if desired.

Figures 8 and 9 illustrate a further modification. In this case, the sheet 10b has the luminescent material impregnated or incorporated therein in distinction from the disclosure of the preceding figures where the luminescent material is applied to one or other of the sheets 10, 11 and 13a.

In every case the inner sheet permits free transmission of ultraviolet rays to energize the fluorescent pigment and causes it to fluoresce. In every case the outer transparent sheet permits the passage of visible light rays from the activated fluorescent pigment while at the same time barring or at any rate substantially limiting the contact of the deleterious light rays from the sun with the fluorescent pigment.

It will be realized that whereas I have shown and described an operative device, still many changes might be made in the size, shape, number and arrangement of parts without departing materially from the spirit of my invention. I wish, therefore, that my showing be taken as in a large sense diagrammatic and illustrative rather than limiting me to the precise showing.

The use and operation of my invention are as follows:

I have disclosed two or three sheets of plastic. More sheets might be used. The essential thing is that the outer sheet exposed to the sunlight and to the elements will be a sheet which will absorb ultraviolet rays up to about 3500 angstrom units. The sheet on the unexposed side of the display subjected to the ultraviolet rays from a controlled source will transmit those rays from 2650 angstrom units.

Both sheets are capable of transmitting visible light rays. The exposed sheet is capable of transmitting visible light rays only but the rear sheet transmits both visible and ultraviolet rays so that the fluorescent pigments are energized under controlled conditions only by the controlled artificial ultraviolet light source but when left exposed to the sun and elements do not deteriorate as a result of such exposure.

The sign is for example exposed twenty-four hours a day but during a substantial part of the time there is no sunlight so if it is artificially activated only during the time the display is needed, only a small percentage of the twenty-four hours of the day, its life will be greatly increased.

While under some circumstances, a sandwich is formed of the two plastic layers with a luminescent pattern or display between them, as indicated in the drawings, it is also possible in order to increase the daylight value of the display and to obtain an increased portection against deteriorating rays in sun and daylight, to screen or spray two different types of paint on the two opposed surfaces of the plastic panels forming the display; one comprising luminescent material on the panel closest to the ultraviolet source and a skim coat of conventional transparent paint on the opposed side of the panel facing the spectator so that the two painted surfaces are together in the sandwich.

Referring specifically to Figure 4 for example, the fluorescent pattern would be associated with plate 10 on its inside and the normal colored non-translucent pattern would be associated with plate 11 on its inside, the two being brought together so that the pattern defined by the translucent and by the luminous paint coincide and the normal conventional paint gives a further protection to the luminescent picture which it covers. This gives therefore higher visibility under daylight conditions and also deeper color under ultraviolet excitation.

I claim:

1. An illuminated display including a source of ultraviolet light and a display device positioned to receive the ultraviolet light rays transmitted by said source, said device including a laminated composite sheet formed from a plurality of superimposed plastic sheets, the plastic sheet nearest the ultraviolet light source being adapted to transmit ultraviolet light rays greater than 2650 angstrom units, the sheet furthest from the source being formed from a material absorbing ultraviolet light rays up to 3650 angstrom units and adapted to transmit visible light rays therethrough, and luminescent material in said composite sheet between said sheet furthest from said source and the source of ultraviolet light.

2. A display device as set forth in claim 1 wherein said plastic sheets are bonded together with a binder between the two sheets.

3. The device of claim 1 characterized by the fact that the luminescent material is enclosed between the plastic sheets against contact with the elements.

4. An illuminated display as set forth in claim 1 the luminescent material is carried by an intermediate sheet positioned between the two plastic sheets and the two plastic sheets are bonded to the intermediate sheet.

5. An illuminated display as set forth in claim 1 wherein a binder coating is positioned between said two plastic sheets and the luminescent material is a coating positioned between said two plastic sheets.

6. An illuminated display as set forth in claim 1 wherein said two plastic sheets are bonded together and luminescent material dispersed throughout the body of the sheet nearest the ultraviolet source.

7. A luminescent sign including a composite sheet having a predetermined configuration, said sheet including a plurality of plastic layers superimposed and bonded together, one layer on the outer side of said sheet absorbing ultraviolet rays up to 3650 angstrom units while transmitting visible light rays, a layer on the other side of said sheet being adapted to transmit ultraviolet rays of at least 2650 angstrom units, and luminescent material, adapted to emit visible light rays when energized by ultraviolet light rays, between the outer surfaces of said composite sheet.

8. In combination, a controlled artificial source of ultraviolet light, a display member exposed thereto including a display of luminescent material adapted to be exposed to the sunlight, a mask interposed between the luminescent material and the sunlight, relatively impervious to the ultraviolet rays of the sun but pervious to visible light rays and a mask interposed between the source of artificial ultraviolet light and the display pervious to ultraviolet rays.

9. An illuminated display including a source of ultraviolet light and a display device positioned to receive the ultraviolet light rays transmitted by said source, said device including a laminated composite sheet formed from a plurality of superimposed plastic sheets, the plastic sheet nearest the ultraviolet light source being adapted to transmit ultraviolet light rays greater than 2650 angstrom units, the sheet furthest from the source being formed from a material absorbing ultraviolet light rays up to 3650 angstrom units and adapted to transmit visible light rays therethrough, and luminescent material in said composite sheet between said sheet furthest from said source and the source of ultraviolet light, there being a pattern of conventional transparent paint corresponding to the same wave length as the luminescent material conforming in dimension to the luminescent material pattern and on the side of that pattern furthest from the ultraviolet light ray source.

10. The display device of claim 9 wherein the luminescent material is applied to the sheet nearest the light source, the conventional paint is applied to the sheet furthest from the light source, the application being respectively to the opposed sides of the sheet whereby the luminescent and the conventional layers are enclosed between the two plastic sheets.

11. The display device of claim 9 wherein the pattern defined by the luminescent and the non-luminescent color material is identical and co-extensive.

References Cited in the file of this patent

UNITED STATES PATENTS

| | | |
|---|---|---|
| 1,342,767 | Schlesinger | June 8, 1920 |
| 1,349,396 | Van Clief | Aug. 10, 1920 |
| 1,813,491 | Gillard | July 7, 1931 |
| 2,213,868 | Lucian | Sept. 3, 1940 |
| 2,480,584 | Kohlahauer et al. | Aug. 30, 1949 |
| 2,509,707 | Taylor | May 30, 1950 |